US012715969B2

(12) United States Patent
Iwata

(10) Patent No.: US 12,715,969 B2
(45) Date of Patent: Aug. 25, 2026

(54) PREPREG AND METHOD FOR MANUFACTURING SAME

(71) Applicant: The Yokohama Rubber Co., LTD., Tokyo (JP)

(72) Inventor: Mitsuhiro Iwata, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 482 days.

(21) Appl. No.: 17/753,116

(22) PCT Filed: Aug. 20, 2020

(86) PCT No.: PCT/JP2020/031477
§ 371 (c)(1),
(2) Date: Feb. 18, 2022

(87) PCT Pub. No.: WO2021/039590
PCT Pub. Date: Mar. 4, 2021

(65) Prior Publication Data
US 2022/0266543 A1 Aug. 25, 2022

(30) Foreign Application Priority Data
Aug. 23, 2019 (JP) ................................ 2019-152738

(51) Int. Cl.
*C08J 5/24* (2006.01)
*B29B 11/16* (2006.01)
(Continued)

(52) U.S. Cl.
CPC ............... *C08J 5/248* (2021.05); *B29B 11/16* (2013.01); *B29C 70/224* (2013.01);
(Continued)

(58) Field of Classification Search
CPC ........ D06M 15/55; B32B 27/06; B32B 27/08; B32B 27/12; B32B 27/20; B32B 27/38;
(Continued)

(56) References Cited

U.S. PATENT DOCUMENTS 6,045,898 A * 4/2000 Kishi ...................... C08J 5/249 525/107
2006/0292321 A1* 12/2006 Chervin ................. B32B 27/12 428/34.6
(Continued)

FOREIGN PATENT DOCUMENTS

CN 105733186 A 7/2016
JP S62-30126 A 2/1987
(Continued)

OTHER PUBLICATIONS

JP 02-106439 U, JPO translation, 1990.*
(Continued)

*Primary Examiner* — Larissa Rowe Emrich
(74) *Attorney, Agent, or Firm* — Thorpe North & Western

(57) ABSTRACT

A glass fiber fabric is impregnated with a colored resin having an opacifying property, a colored resin layer formed from the colored resin is provided on a first face of the glass fiber fabric, a transparent resin layer becoming transparent after being cured is provided on a second face of the glass fiber fabric, and thus a prepreg is formed.

17 Claims, 6 Drawing Sheets

(51) Int. Cl.
*B29C 70/22* (2006.01)
*B29K 63/00* (2006.01)
*B29K 105/08* (2006.01)
*B29K 309/08* (2006.01)

(52) U.S. Cl.
CPC .... *B29K 2063/00* (2013.01); *B29K 2105/089* (2013.01); *B29K 2309/08* (2013.01); *B29K 2995/002* (2013.01); *B29K 2995/0026* (2013.01)

(58) Field of Classification Search
CPC .......... B32B 2255/02; B32B 2260/021; B32B 2260/046; B32B 2262/101; B32B 2307/402; B32B 2307/4026; B32B 2307/41; B32B 2307/412; C08J 5/244; C08J 5/24–249; B29K 2063/00; B29K 2105/089; B29K 2309/08; B29K 2995/002; B29K 2995/0026; D06N 3/0006; D06N 3/0022; D06N 3/0063; D06N 3/0068; D06N 3/12; D06N 2209/0823; D06N 2209/0853; D06N 2209/0861; D06N 3/18; D06N 3/186; D06N 2213/03
USPC ............... 428/542.8, 196; 442/172, 175, 180
See application file for complete search history.

(56) References Cited

U.S. PATENT DOCUMENTS

| | | | | |
|---|---|---|---|---|
| 2010/0065317 | A1 | 3/2010 | Okada | |
| 2017/0130017 | A1* | 5/2017 | Okamoto | C08J 5/042 |
| 2017/0282516 | A1* | 10/2017 | Teranishi | C08G 59/226 |
| 2018/0208708 | A1* | 7/2018 | Kanayama | C08G 18/4829 |
| 2019/0119435 | A1* | 4/2019 | Asai | C08G 59/5073 |
| 2019/0150279 | A1* | 5/2019 | Obata | H01L 23/145<br>174/258 |
| 2019/0225764 | A1* | 7/2019 | Harada | C08L 63/00 |
| 2020/0047430 | A1 | 2/2020 | Konami | |
| 2020/0071524 | A1* | 3/2020 | Iwata | C08J 5/249 |
| 2021/0331428 | A1 | 10/2021 | Konami | |
| 2023/0133111 | A1* | 5/2023 | Iwata | C08K 7/02<br>523/427 |

FOREIGN PATENT DOCUMENTS

| | | | | |
|---|---|---|---|---|
| JP | 03-119038 | A | | 5/1991 |
| JP | 03-139531 | A | | 6/1991 |
| JP | H08-259713 | A | | 10/1996 |
| JP | 2011213784 | A | * | 10/2011 |
| JP | 2013-023511 | A | | 2/2013 |
| JP | 2016-094608 | A | | 5/2016 |
| JP | 2018-202771 | A | | 12/2018 |
| TW | 200846397 | A | | 12/2008 |
| WO | 2008/129815 | A1 | | 10/2008 |
| WO | WO 2018/199154 | A1 | | 11/2018 |

OTHER PUBLICATIONS

Plgment Color Index: Yellow Pigments, JacksonArt.com, https://www.jacksonsart.com/blog/2021/09/17/pigment-colour-index-yellow-pigments/, 2021.*
Plgment Color Index: Green Pigments, JacksonArt.com, https://www.jacksonsart.com/blog/2021/10/25/pigment-colour-index-green-pigments/, 2021.*
Plgment Color Index: Blue Pigments, JacksonArt.com, https://www.jacksonsart.com/blog/2021/10/15/pigment-colour-index-blue-pigments/, 2021.*
Plgment Color Index: Red Pigments, JacksonArt.com, https://www.jacksonsart.com/blog/2021/10/01/pigment-colour-index-red-pigments/, 2021.*
Microfilm of the specification and drawings annexed to the request of Japanese Utility Model Application No. 014948/1989 (Laid-open No. 106439/1990) (UBE-NITTO Kasei co., LTD.) Aug. 23, 1990 (Aug. 23, 1990) claims, specification, p. 3, line 20 to p. 4, line 5, p. 6, line 11 to p. 9, line 12, fig. 3.

* cited by examiner

FIG. 1A1
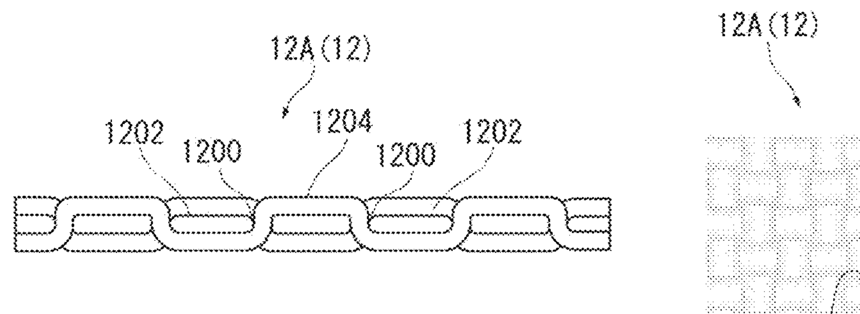
FIG. 1B1
FIG. 1A2
FIG. 1B2
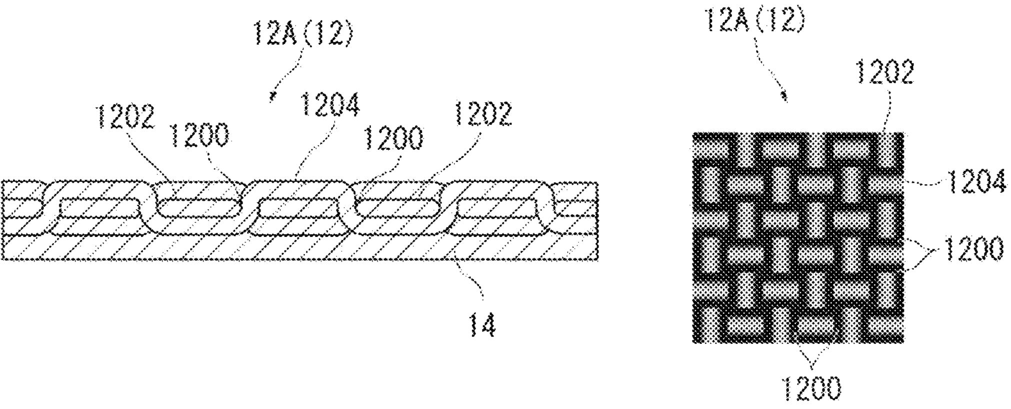
FIG. 1A3
FIG. 1B3
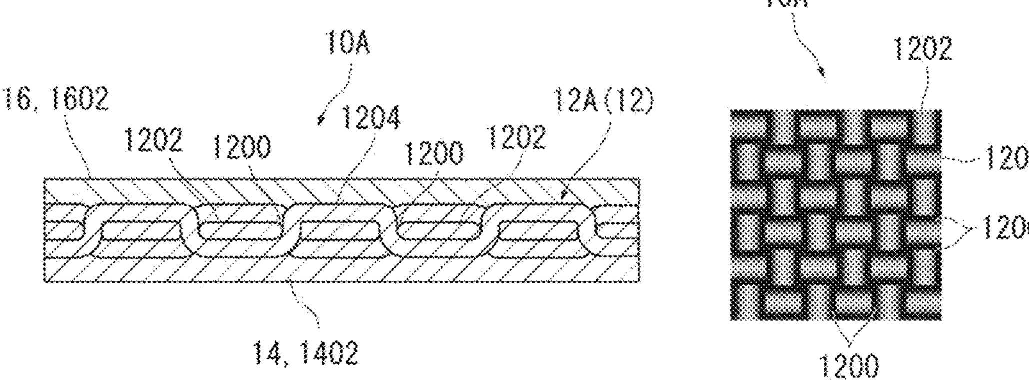

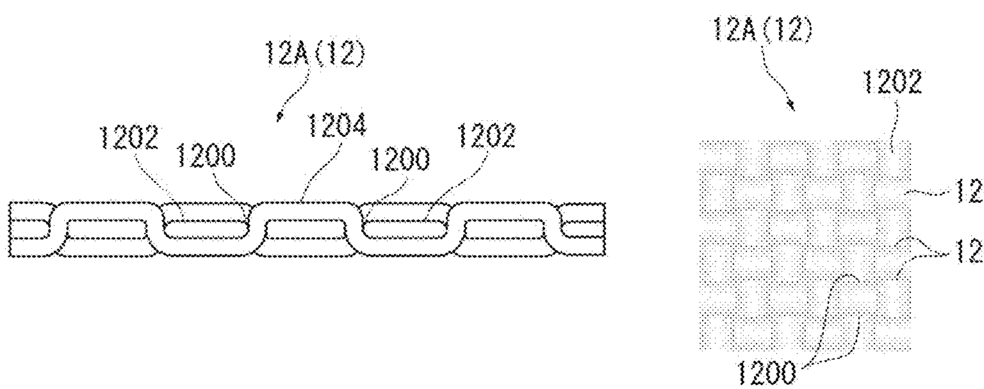
FIG. 3A1
12A(12)
1202
1200
1204
1200
1202
FIG. 3B1
12A(12)
1202
1204
1200
1200
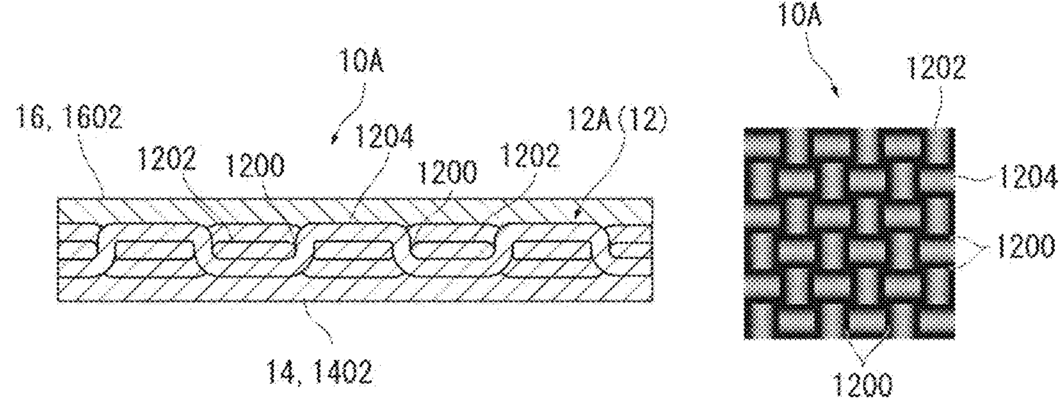
FIG. 3A3
10A
16, 1602
1202
1200
1204
1200
1202
12A(12)
14, 1402
FIG. 3B3
10A
1202
1204
1200
1200

FIG. 5A1
12A (12)
1202
1200
1204
1200
1202
1200
1200
FIG. 5B1
12A (12)
1202
1204
1200
1200
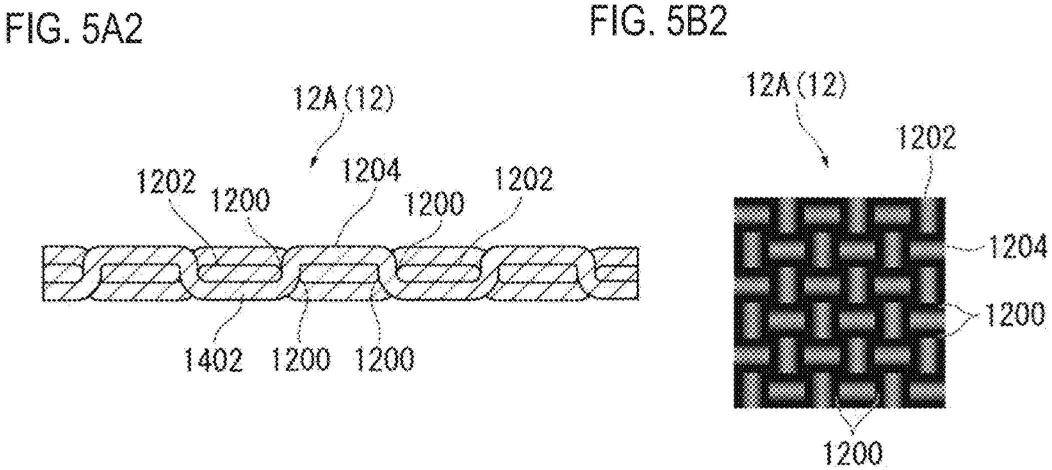
FIG. 5A2
FIG. 5B2
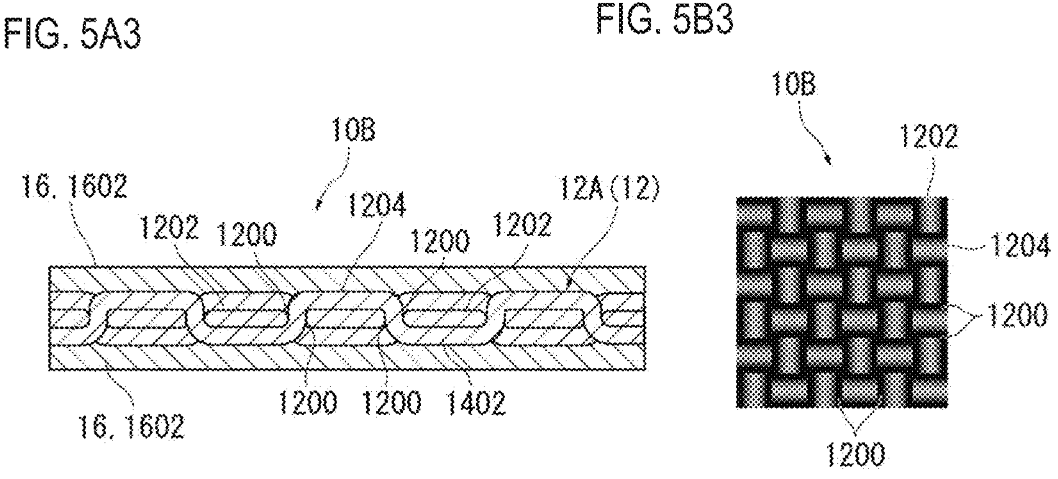
FIG. 5A3
FIG. 5B3

PREPREG AND METHOD FOR MANUFACTURING SAME

TECHNICAL FIELD

The present technology relates to a prepreg and a method for manufacturing the same.

BACKGROUND ART

A prepreg in which a reinforcement fiber fabric is impregnated with a thermosetting resin, the reinforcement fiber fabric woven by using a reinforcement fiber made of carbon fibers, has been provided.

When this prepreg is pressurized and heated by using a mold, the thermosetting resin is heat-cured, and a molded product formed from a fiber reinforced resin having a desired shape is produced.

In a case where a prepreg using a reinforcement fiber fabric formed from carbon fibers and a transparent thermosetting resin is produced and then a fiber reinforced resin is produced by using the prepreg, because the carbon fibers exhibit black color, the weave of the reinforcement fiber fabric exhibiting black color can be visually confirmed in an inner portion of a resin layer when the obtained molded product is seen.

Thus, the design of the molded product formed from the fiber reinforced resin gives a sense of luxuriousness.

However, the design of the molded product is only based on the reinforcement fiber fabric formed from carbon fibers, and there is a problem in that a desired design cannot be provided.

Meanwhile, technology has been proposed for obtaining a prepreg by preparing a transparent colored resin, in which a dye or pigment that does not exhibit opacifying property but can color has been added, and impregnating colorless reinforcement fibers, such as glass fibers, with this transparent colored resin (see Japan Unexamined Patent Publication No. S62-030126).

However, when a molded product produced using the prepreg of Japan Unexamined Patent Publication No. S62-030126 is examined, the reinforcement fibers seem colorless through the transparent colored resin, and thus there is a problem in that the reinforcement fibers are recognized as an unclear pale pattern and the design of the molded product cannot be enhanced.

SUMMARY

The present technology provides a prepreg that is advantageous to allow a molded product formed from a fiber reinforced resin using reinforcement fibers to have a desired design and to provide luxuriousness, and the method for manufacturing the prepreg.

An embodiment of the present technology is a prepreg including: a reinforcement fiber fabric, a colored resin layer, the colored resin layer being provided on a first face of the reinforcement fiber fabric and being formed from a colored resin having an opacifying property, and a transparent resin layer, the transparent resin layer being provided on a second face of the reinforcement fiber fabric and being formed from a transparent resin becoming transparent after being cured, the reinforcement fiber fabric being impregnated with the colored resin.

Furthermore, an embodiment of the present technology is a prepreg comprising: a reinforcement fiber fabric, and a transparent resin layer, the transparent resin layer being provided on both faces of the reinforcement fiber fabric and being formed from a transparent resin becoming transparent after being cured, the reinforcement fiber fabric being impregnated with the colored resin having an opacifying property.

Furthermore, an embodiment of the present technology is a method for manufacturing a prepreg, the method including: colored resin coating of impregnating a reinforcement fiber fabric with a colored resin that is colored and that has an opacifying property and forming a colored resin layer on a first face of the reinforcement fiber fabric, and transparent resin coating of forming a transparent resin layer by coating a second face of the reinforcement fiber fabric with a transparent resin that becomes transparent after being cured.

Furthermore, an embodiment of the present technology is a method for manufacturing a prepreg, the method comprising: colored resin impregnating of impregnating a reinforcement fiber fabric with a colored resin that is colored and that has an opacifying property, and transparent resin coating of forming a transparent resin layer on both faces by coating both the faces of the reinforcement fiber fabric with a transparent resin that becomes transparent after being cured.

According to an embodiment of the present technology, because a reinforcement fiber fabric is impregnated with a colored resin having an opacifying property and a colored resin layer having an opacifying property is provided on a first face of the reinforcement fiber fabric, and a transparent resin layer that becomes transparent after being cured is provided on a second face of the reinforcement fiber fabric, when a molded product obtained by heat-curing the prepreg is viewed from the transparent resin layer side, the colored reinforcement fiber fabric and the weave of the reinforcement fiber fabric can be visually confirmed in an inner portion of the transparent resin layer, and thus it is advantageous to provide a desired design of the molded product formed from the fiber reinforced resin and to provide luxuriousness.

Furthermore, according to an embodiment of the present technology, because transparent resin layers that become transparent after being cured are provided on both faces of a reinforcement fiber fabric impregnated with a colored resin having an opacifying property, when a molded product obtained by heat-curing the prepreg is viewed from any one of the transparent resin layer sides, the reinforcement fiber fabric colored by the colored resin and the weave thereof can be visually confirmed in an inner portion of the transparent resin layer, and thus it is advantageous to provide a desired design on both the faces of the molded product formed from the fiber reinforced resin and to provide luxuriousness.

Furthermore, an embodiment of the present technology is advantageous to reliably manufacture a prepreg for obtaining a molded product having luxuriousness and a desired design in which a reinforcement fiber fabric colored by a colored resin having an opacifying property and the weave thereof can be visually confirmed in an inner portion of a transparent resin layer that becomes transparent after being cured, without the need for a complicated process but by simple processes such as colored resin coating and transparent resin coating while suppression of manufacturing cost is attempted.

Furthermore, an embodiment of the present technology is advantageous to reliably manufacture a prepreg for obtaining a molded product having luxuriousness and a desired design in which a reinforcement fiber fabric colored by a colored resin having an opacifying property and the weave thereof formed on both the faces can be visually confirmed in an inner portion of a transparent resin layer that becomes transparent after being cured, without the need for a complicated process but by simple processes such as colored resin impregnating and transparent resin coating while suppression of manufacturing cost is attempted.

BRIEF DESCRIPTION OF DRAWINGS

FIGS. 1A1-1B3 are explanatory diagrams of a glass fiber fabric corresponding to a manufacturing process of a prepreg according to a first embodiment. FIG. 1A1 is a cross-sectional view of a glass fiber fabric, FIG. 1B1 is a plan view when a glass fiber fabric of FIG. 1A1 is viewed from a second face to which a transparent resin layer is provided, FIG. 1A2 is a cross-sectional view illustrating a condition where a glass fiber fabric is impregnated with a colored resin and a colored resin layer is formed on a first face, FIG. 1B2 is a plan view when a glass fiber fabric of FIG. 1A2 is viewed from a second face to which a transparent resin layer is provided, FIG. 1A3 is a cross-sectional view illustrating a condition where a transparent resin layer is provided on a second face of a glass fiber fabric and a prepreg is formed, and FIG. 1B3 is a plan view when a prepreg is viewed from a transparent resin layer side.

FIG. 2 is a schematic diagram of a manufacturing device corresponding to manufacturing process of a prepreg according to a first embodiment.

FIGS. 3A1-3B3 are explanatory diagrams of a glass fiber fabric corresponding to a manufacturing process of a prepreg according to a second embodiment. FIG. 3A1 is a cross-sectional view of a glass fiber fabric, FIG. 3B1 is a plan view when a glass fiber fabric of FIG. 3A1 is viewed from a second face to which a transparent resin layer is provided, FIG. 3A3 is a cross-sectional view illustrating a condition where a glass fiber fabric is impregnated with a colored resin and a colored resin layer is formed on a first face and a transparent resin layer is provided on a second face of the glass fiber fabric and a prepreg is formed, and FIG. 3B3 is a plan view when a prepreg is viewed from a transparent resin layer side.

FIGS. 5A1-5B3 are explanatory diagrams of a glass fiber fabric corresponding to a manufacturing process of a prepreg according to a third embodiment. FIG. 5A1 is a cross-sectional view of a glass fiber fabric, FIG. 5B1 is a plan view of a glass fiber fabric of FIG. 5A1, FIG. 5A2 is a cross-sectional view illustrating a condition where a glass fiber fabric is impregnated with a colored resin, FIG. 5B2 is a plan view of a glass fiber fabric of FIG. 5A2, FIG. 5A3 is a cross-sectional view illustrating a condition where transparent resin layers are provided on both faces of a glass fiber fabric and a prepreg is formed, and FIG. 5B3 is a plan view of a prepreg of FIG. 5A3.

DETAILED DESCRIPTION

First Embodiment

Figure 2:
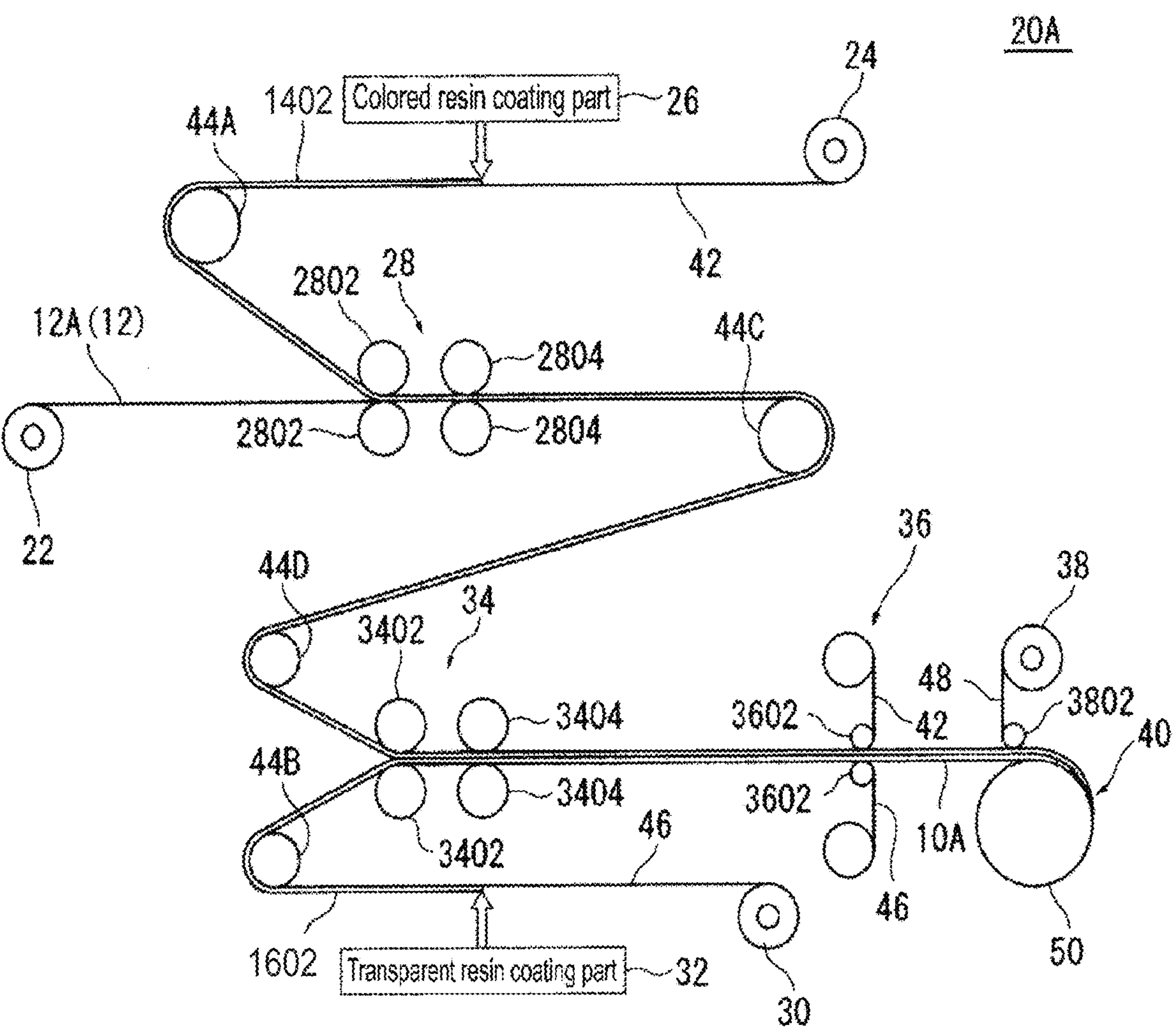

Now, embodiments of the present technology will be described with reference to the drawings.

First, the prepreg will be described, and then the manufacturing method thereof will be described.

FIG. 1A3 is a cross-sectional view illustrating the structure of a prepreg 10A.

The prepreg 10A is formed from a reinforcement fiber fabric 12, a colored resin layer 14, and a transparent resin layer 16.

In the present embodiment, a transparent or translucent glass fiber fabric 12A is used as the reinforcement fiber fabric 12.

As illustrated in FIGS. 1A1 and 1B1, the glass fiber fabric 12A is formed by weaving warp 1202 and weft 1204 formed from transparent or translucent glass fibers and has a sheet shape.

In more detail, the glass fiber fabric 12A is formed by weaving a plurality of fiber bundles formed by bundling a plurality of filaments formed from glass fibers as the warp 1202 and the weft 1204.

The weave structure of the glass fiber fabric 12A is not limited to an ordinary plain weave, and various known weave structures such as twill weave and sateen weave can be employed.

Note that the reinforcement fiber fabric 12 is not limited to the glass fiber fabric 12A and may be transparent (including colorless transparent and colored transparent), translucent (including colorless translucent and colored translucent), or opaque. For example, a reinforcement fiber fabric 12 using various known reinforcement fibers such as aramid fibers (Kevlar fibers), polyethylene fibers, boron fibers, or carbon fibers as the reinforcement fibers constituting the fabric can be used.

The colored resin layer 14 is formed from a colored resin 1402 having an opacifying property.

The colored resin layer 14 is provided on a first face of the glass fiber fabric 12A, and the glass fiber fabric 12A is impregnated with the colored resin 1402 constituting the colored resin layer 14.

In detail, a plurality of filaments having vacant space portions therebetween and constituting the warp 1202 and the weft 1204 are impregnated with the colored resin 1402.

Furthermore, the colored resin layer 14 covers the first face of the glass fiber fabric 12A with its thickness.

When the glass fiber fabric 12A is viewed from the second face, the colored resin 1402 is colored in a manner that the glass fiber fabric 12A impregnated with the colored resin 1402 and the weave 1200 thereof are visually confirmed in an inner portion of the colored resin 1402, in other words, for example, the hue, lightness, saturation of the colored resin 1402 are set.

The colored resin 1402 is a resin that has been colored by various known pigments or dyes having the opacifying property, such as titanium oxide, zinc oxide, metal powders, and carbon black, and as such a resin, a thermosetting resin that is cured by heating is used.

In the present embodiment, an epoxy resin is used as such a thermosetting resin, and various known thermosetting resins can be used.

The transparent resin layer 16 is provided on a second face of the glass fiber fabric 12A and covers the second face of the glass fiber fabric 12A with its thickness.

The transparent resin layer 16 is at least formed from a transparent resin 1602 that becomes transparent after being cured in a manner that the glass fiber fabric 12A and the weave 1200 thereof can be visually confirmed.

The transparent resin layer 16 is only required to allow the glass fiber fabric 12A and the weave 1200 thereof to be visually confirmed, and thus may be formed from a resin that is translucent to a degree by which the glass fiber fabric 12A and the weave 1200 thereof can be visually confirmed after being cured or a resin that is colored and becomes transparent. Use of a resin that becomes colored transparent after being cured is advantageous from the perspective of facilitating visual confirmation of the weave 1200, and use of a resin that becomes colorless transparent after being cured is more advantageous from the perspective of facilitating visual confirmation of the weave 1200.

Thus, the transparent resin layer that becomes transparent after being cured in an embodiment of the present technology includes a transparent resin layer formed from a resin that becomes translucent after being cured in addition to a transparent resin layer formed from a resin that becomes colorless or colored transparent after being cured.

As the transparent resin layer 16 described above, similarly to the colored resin layer 14, a thermosetting resin that is cured by heating is used, and various known thermosetting resins, such as an epoxy resin, can be used as the thermosetting resin.

Note that, when the colored resin layer 14 (colored resin 1402) and the transparent resin layer 16 (transparent resin 1602) are formed from an identical resin material, adhesiveness of the colored resin 1402 which has infiltrated into the glass fiber fabric 12A and the transparent resin layer 16 provided on the second face of the glass fiber fabric 12A can be ensured, and enhancement of the strength of the prepreg 10A can be advantageously attempted.

According to the prepreg 10A of the present embodiment, a glass fiber fabric 12A is impregnated with a colored resin 1402 having the opacifying property, a colored resin layer 14 formed from the colored resin 1402 is provided on a first face of the glass fiber fabric 12A, and a transparent resin layer 16 becoming transparent after being cured is provided on a second face of the glass fiber fabric 12A.

Thus, when a molded product obtained by heat-curing the prepreg 10A is viewed from the transparent resin layer 16 side, the colored glass fiber fabric 12A and the weave 1200 of the glass fiber fabric 12A can be visually confirmed in an inner portion of the transparent resin layer 16, and thus it is advantageous to allow the molded product formed from the fiber reinforced resin to have a desired design and to provide luxuriousness.

Furthermore, because, in the prepreg 10A, the glass fiber fabric 12A is impregnated with the colored resin 1402 having the opacifying property, in a case where the prepreg 10A is laminated on a surface of an existing prepreg for FRP (fiber-reinforced polymer) manufacture and cured to obtain a molded product, the prepreg for FRP manufacture after the curing is not visually confirmed through the prepreg 10A after the curing, and thus it is advantageous to allow the molded product to have a desired design and luxuriousness by the prepreg 10A.

Next, the method for manufacturing the prepreg will be described with reference to a schematic diagram of a manufacturing device 20A of the prepreg 10A illustrated in FIG. 2.

The manufacturing device 20A includes a fiber fabric supplying part 22, a first release paper supplying part 24, a colored resin coating part 26, a first pressurizing and heating part 28, a second release paper supplying part 30, a transparent resin coating part 32, a second pressurizing and heating part 34, a release paper collecting part 36, a protective film laminating part 38, and a prepreg winding part 40.

The fiber fabric supplying part 22 supplies a glass fiber fabric 12A from an original material of the glass fiber fabric 12A wound in a roll form.

FIG. 1A1 illustrates a cross-section of the glass fiber fabric 12A, and FIG. 1B1 illustrates a diagram of the glass fiber fabric 12A viewed from a second face, to which a transparent resin layer 16 is provided.

The first release paper supplying part 24 supplies a first release paper 42 from an original material of the first release paper 42 wound in a roll form.

The colored resin coating part 26 coats a surface of the first release paper 42 supplied from the first release paper supplying part 24 with a colored resin 1402 having the opacifying property in a certain thickness while heating is performed by a heater.

The first pressurizing and heating part 28 includes a pair of pressurizing rollers 2802 and a pair of heating rollers 2804.

The pair of pressurizing rollers 2802 overlays a colored resin 1402 having the opacifying property on the surface of the first release paper 42 supplied through a guide roller 44A, on a first face of the glass fiber fabric 12A supplied from the fiber fabric supplying part 22.

The pair of heating rollers 2804 heats and softens the colored resin 1402 having the opacifying property on the surface of the first release paper 42, and presses the colored resin 1402 onto the first face of the glass fiber fabric 12A.

By this, as illustrated in FIG. 1A2, colored resin coating that impregnates the glass fiber fabric 12A with the colored resin 1402 having the opacifying property and forms the colored resin layer 14 formed from the colored resin 1402 having the opacifying property on the first face of the glass fiber fabric 12A is performed.

Thus, as illustrated in FIG. 1B2, when the glass fiber fabric 12A is viewed from the second face of the glass fiber fabric 12A, to which the transparent resin layer 16 is provided, the colored glass fiber fabric 12A and the weave 1200 thereof can be visually confirmed.

This is because the thickness of the colored resin 1402 applied on the surface of the first release paper 42 by the colored resin coating part 26 is controlled in a manner that the glass fiber fabric 12A is impregnated with the colored resin 1402 and the colored resin layer 14 having a predetermined thickness is formed on the first face of the glass fiber fabric 12A.

Note that, in this case, when the glass fiber fabric 12A is viewed from the first face, on which the colored resin layer 14 of the glass fiber fabric 12A has been formed, because the first face is covered with the colored resin layer 14 having the predetermined thickness, the glass fiber fabric 12A and the weave 1200 thereof cannot be visually confirmed.

The second release paper supplying part 30 supplies a second release paper 46 from an original material of the second release paper 46 wound in a roll form.

The transparent resin coating part 32 coats a surface of the second release paper 46 supplied from the second release paper supplying part 30 with a transparent resin 1602 that becomes transparent after being cured at a certain thickness while heating is performed by a heater, and controls the thickness of the transparent resin 1602 applied by the transparent resin coating part 32. Note that, in the first embodiment and the second and third embodiments below, a material that is transparent both before the curing and after the curing is used as the transparent resin 1602.

The second pressurizing and heating part 34 includes a pair of pressurizing rollers 3402 and a pair of heating rollers 3404.

The pair of the pressurizing rollers 3402 overlays the transparent resin 1602, which becomes transparent after being cured on the surface of the second release paper 46 supplied through a guide roller 44B, on the second face of the glass fiber fabric 12A impregnated with the colored resin 1402 supplied through two guide rollers 44C and 44D.

The pair of heating rollers 3404 heats and softens the transparent resin 1602 that becomes transparent after being cured on the surface of the second release paper 46, and presses the transparent resin 1602 onto the second face of the glass fiber fabric 12A.

By this, as illustrated in FIG. 1A3, the transparent resin coating that forms a transparent resin layer 16 by coating the second face of the glass fiber fabric 12A with the transparent resin 1602 that becomes transparent after being cured is performed, and in this stage, a prepreg 10A having a condition where the first release paper 42 and the second release paper 46 are laminated on both faces in the thickness direction can be obtained.

Thus, by releasing the first release paper 42 and the second release paper 46, the prepreg 10A can be obtained. As illustrated in FIG. 1B3, when the prepreg 10A is viewed from the transparent resin layer 16 side, the glass fiber fabric 12A colored by the colored resin 1402 and the weave 1200 thereof can be visually confirmed in the inner portion of the transparent resin layer 16.

The release paper collecting part 36 allows the first release paper 42 and the second release paper 46 to be released from the prepreg 10A through releasing rollers 3602 and collecting the first release paper 42 and the second release paper 46.

The protective film laminating part 38 laminates the protective film 48 supplied from an original material of a protective film 48 wound in a roll form on a first face in the thickness direction of the prepreg 10A, and in the present embodiment, the protective film 48 is laminated on the first face of the glass fiber fabric 12A formed from the colored resin layer 14 through a laminating roller 3802.

The prepreg winding part 40 winds the prepreg 10A on which the protective film 48 is laminated, and by this, a prepreg original material 50 in a roll form is obtained.

Thus, the prepreg 10A is wound by interposing the protective film 48, and thus the colored resin layer 14 and the transparent resin layer 16 of the prepreg 10A that are stacked are separated without contact.

When the obtained prepreg 10A is pressurized and heated by using a mold, the colored resin 1402 and the transparent resin 1602 are heat-cured, and a molded product formed from a glass fiber reinforced resin having a desired shape is obtained.

Note that, at the time of the pressuring and heating of the prepreg 10A, when the colored resin 1402 which has infiltrated into the glass fiber fabric 12A flows to the transparent resin layer 16 side or when the transparent resin 1602 constituting the transparent resin layer 16 flows into the glass fiber fabric 12A, an uneven pattern may be formed and may be disadvantageous to enhance design of the molded product.

When an additive that suppresses resin flow at the time of curing is blended in at least one of the colored resin 1402 or the transparent resin 1602, at the time of the pressuring and heating of the prepreg 10A, flow of the colored resin 1402 which has infiltrated into the glass fiber fabric 12A to the transparent resin layer 16 side is suppressed or flow of the transparent resin 1602 constituting the transparent resin layer 16 into the glass fiber fabric 12A is suppressed, and thus formation of the uneven pattern is prevented and it becomes advantageous to enhance design of the obtained molded product.

Examples of such an additive include silica microparticles and elastomer microparticles.

Examples of the silica microparticles include microparticles having an average particle diameter of 1000 nm or less, and preferably of from 5 to 100 nm, and the type of the silica is preferably hydrophilic silica microparticles. Examples thereof include amorphous synthetic silica, such as precipitated silica, silica gel, pyrogenic silica, and molten silica; crystalline synthetic silica; and natural silica. As the silica microparticles, commercially available silica microparticles can be appropriately selected. Examples thereof include CAB-O-SIL M5 (hydrophilic fumed silica) available from Cabot Corporation, and trade name: AEROSIL 200 (average particle diameter: 12 nm) available from Nippon Aerosil Co., Ltd.

Examples of the elastomer microparticles include microparticles having an average particle diameter of 1000 nm or less, preferably 500 nm or less, and even more preferably 300 nm or less. Among these, known core-shell type microparticles are suitable and, for example, a particle obtained by, on a surface of a particulate core component having a crosslinked rubber-like polymer as a main component, graft-polymerizing a shell component polymer different from the core component can be employed. Examples of the core component include butadiene rubber, acrylic rubber, silicone rubber, butyl rubber, NBR (nitrile rubber or acrylonitrile butadiene rubber), SBR (styrene butadiene rubber), IR (isoprene rubber), and EPR (ethylene propylene rubber). Examples of the shell component include polymers obtained by polymerizing monomers selected from acrylate-based monomers, methacrylate-based monomers, and aromatic vinyl monomers. The elastomer microparticles can be appropriately selected from those commercially available, and examples thereof include MX-154 (epoxy resin/core-shell rubber particle master batch; containing 40 mass % of butadiene-based core-shell rubber particles; average particle diameter=100 to 200 nm) available from Kaneka Corporation, and MX-125 (epoxy resin/core-shell rubber particle master batch; containing 25 mass % of SBR-based core-shell rubber particles; average particle diameter=100 to 200 nm) available from Kaneka Corporation.

Note that the average particle diameter refers to the average value of the equivalent circle diameter measured using an electron microscope, laser microscope, or the like and, for example, can be measured by the laser diffraction scattering particle size distribution analyzer LA-300 (available from Horiba, Ltd.) and laser microscope VK-8710 (available from Keyence Corporation).

As described above, according to the method for manufacturing the prepreg of the present embodiment, the glass fiber fabric 12A colored by the colored resin 1402 having the opacifying property and the weave 1200 thereof can be visually confirmed in the inner portion of the transparent resin layer 16 that becomes transparent after being cured.

That is, it is advantageous to reliably manufacture the prepreg 10A for obtaining a molded product having luxuriousness and a desired design by the colored resin 1402 having the opacifying property, without the need for a complicated process but by simple processes such as colored resin coating and transparent resin coating while suppression of manufacturing cost is attempted.

Second Embodiment

Next, a second embodiment will be described with reference to FIGS. 3 and 4.

Note that, in the embodiments described below, elements and members identical or similar to those of the first embodiment have reference signs identical to those of the first embodiment, and descriptions thereof are omitted, while different elements from the first embodiment are mainly described.

The second embodiment is a modified example of the method for manufacturing a prepreg of the first embodiment and, in the second embodiment, the colored resin coating and the transparent resin coating are simultaneously performed, contrary to the first embodiment in which the transparent resin coating is performed after the colored resin coating.

Figure 4:
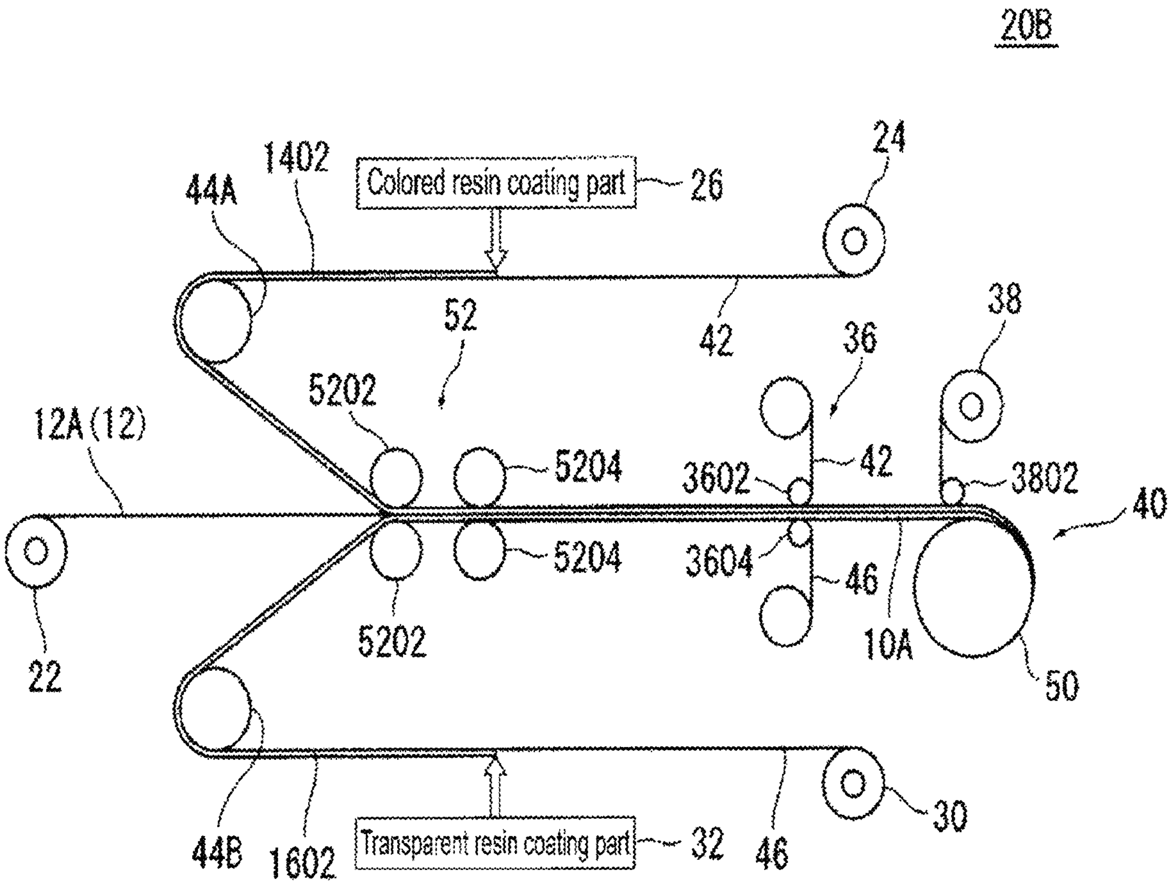
FIG. 4 is a schematic diagram of a manufacturing device corresponding to manufacturing process of a prepreg according to a second embodiment.

As illustrated in FIG. 4, in the second embodiment, a manufacturing device 20B of the prepreg 10A includes a fiber fabric supplying part 22, a first release paper supplying part 24, a colored resin coating part 26, a second release paper supplying part 30, a transparent resin coating part 32, a pressurizing and heating part 52, a release paper collecting part 36, a protective film laminating part 38, and a prepreg winding part 40.

In the second embodiment, the configurations other than the pressurizing and heating part 52 are identical to those of the first embodiment, and thus the description thereof will be omitted.

The pressurizing and heating part 52 includes a pair of pressurizing rollers 5202 and a pair of heating rollers 5204.

The pair of pressurizing rollers 5202 overlays a colored resin 1402 having the opacifying property on a surface of a first release paper 42 supplied through a guide roller 44A on a first face of a glass fiber fabric 12A supplied from the fiber fabric supplying part 22 and, at the same time, overlays a transparent resin 1602, which becomes transparent after being cured on a surface of a second release paper 46 supplied through a guide roller 44B, on a second face of the glass fiber fabric 12A supplied from the fiber fabric supplying part 22.

The pair of heating rollers 5204 heats and softens the colored resin 1402 having the opacifying property on the surface of the first release paper 42, and presses the colored resin 1402 onto the first face of the glass fiber fabric 12A and, at the same time, heats and softens the transparent resin 1602 that becomes transparent after being cured on the surface of the second release paper 46, and presses the transparent resin 1602 onto the second face of the glass fiber fabric 12A.

By this, as illustrated in FIGS. 3A3 and 3B3, the colored resin coating that presses the colored resin 1402 having the opacifying property onto the first face of the glass fiber fabric 12A by the single pressurizing and heating part 52 and heats and the transparent resin coating that presses the transparent resin 1602 that becomes transparent after being cured onto the second face of the glass fiber fabric 12A and heats are simultaneously performed, and in this stage, a prepreg 10A having a condition where the first release paper 42 and the second release paper 46 are laminated on both faces in the thickness direction can be obtained.

Thus, by releasing the first release paper 42 and the second release paper 46, the prepreg 10A can be obtained. As illustrated in FIG. 3B3, when the prepreg 10A is viewed from the transparent resin layer 16 side, the glass fiber fabric 12A colored by the colored resin 1402 having the opacifying property and the weave 1200 thereof can be visually confirmed in the inner portion of the transparent resin layer 16.

Also, in this case, similarly to the first embodiment, the thickness of the colored resin 1402 applied on the surface of the first release paper 42 by the colored resin coating part 26 is controlled in a manner that the glass fiber fabric 12A is impregnated with the colored resin 1402 and the colored resin layer 14 having a predetermined thickness is formed on the first face of the glass fiber fabric 12A, and naturally the thickness of the transparent resin layer 16 is also controlled.

Furthermore, the first release paper 42 and the second release paper 46 are released from the prepreg 10A through the releasing rollers 3602 and 3604 and collected by the release paper collecting part 36, a protective film 48 is laminated on the first face of the glass fiber fabric 12A, on which the colored resin layer 14 has been formed, through a laminating roller 3802 by the protective film laminating part 38, and the prepreg winding part 40 winds the prepreg 10A laminated with the protective film 48, and a prepreg original material 50 in a roll form is thus obtained.

As described above, according to the method for manufacturing a prepreg of the second embodiment, naturally, the effect identical to that of the first embodiment can be achieved, and the colored resin coating and the transparent resin coating are performed simultaneously by the single pressurizing and heating part 52.

While two pressurizing and heating parts, which are the first and second pressurizing and heating parts 28 and 34, are required for the first embodiment, the single pressurizing and heating part 52 is only required to be provided, and thus it is advantageous to attempt simplification of equipment costs and reduction of manufacturing cost.

Furthermore, by blending an additive that suppresses resin flow at the time of curing in at least one of the colored resin 1402 or the transparent resin 1602, at the time of the pressuring and heating of the prepreg 10A, flow of the colored resin 1402 which has infiltrated into the glass fiber fabric 12A to the transparent resin layer 16 side is suppressed or flow of the transparent resin 1602 constituting the transparent resin layer 16 into the glass fiber fabric 12A is suppressed, and thus formation of the uneven pattern is prevented and it becomes advantageous to enhance design of the obtained molded product, which is identical to the first embodiment.

Third Embodiment

Next, a third embodiment will be described with reference to FIGS. 5 and 6.

According to the prepreg 10A of the first and second embodiments, a glass fiber fabric 12A is impregnated with a colored resin 1402 having the opacifying property, a colored resin layer 14 formed from the colored resin 1402 having the opacifying property is provided on a first face of the glass fiber fabric 12A, and a transparent resin layer 16 becoming transparent after being cured is provided on a second face of the glass fiber fabric 12A.

On the other hand, a prepreg 10B of the third embodiment is different from the first and second embodiments in that a glass fiber fabric 12A is impregnated with a colored resin 1402 having the opacifying property and transparent resin layers 16 that become transparent after being cured are provided on both of the faces of the glass fiber fabric 12A.

The glass fiber fabric 12A is impregnated with the colored resin 1402 from the first face or the second face of the glass fiber fabric 12A as illustrated in FIG. 5A2.

In detail, a plurality of filaments having vacant space portions therebetween and constituting the warp 1202 and the weft 1204 are impregnated with the colored resin 1402 and, unlike the first and second embodiments, the colored resin layer 14 is not provided.

Furthermore, as illustrated in FIG. 5A3, the transparent resin layers 16 are provided on both of the faces of the glass fiber fabric 12A impregnated with the colored resin 1402, and the transparent resin layers 16 cover both of the faces of the glass fiber fabric 12A with its thickness.

Thus, in the prepreg 10B of the third embodiment, as illustrated in FIGS. 5A3 and 5B3, the glass fiber fabric 12A colored by the colored resin 1402 and the weave 1200 thereof can be visually confirmed in the inner portion of the transparent resin layer 16 when the glass fiber fabric 12A is viewed from either one side of the transparent resin layers 16.

According to the prepreg 10B of the third embodiment, the transparent resin layers 16 that are transparent after being cured are provided on both of the faces of the glass fiber fabric 12A impregnated with the colored resin 1402 having the opacifying property.

Thus, when a molded product obtained by heat-curing the prepreg 10B is viewed from either one side of the transparent resin layers 16, the glass fiber fabric 12A colored by the colored resin 1402 having the opacifying property and the weave 1200 thereof can be visually confirmed in an inner portion of the transparent resin layer 16, and thus it is advantageous to allow both of the faces of the molded product formed from the glass fiber reinforced resin to have a desired design and to provide luxuriousness.

Furthermore, similarly to the first embodiment, because, in the prepreg 10B, the glass fiber fabric 12A is impregnated with the colored resin 1402 having the opacifying property, in a case where the prepreg 10B is laminated on a surface of an existing prepreg for FRP manufacture and cured to obtain a molded product, the prepreg for FRP manufacture after the curing is not visually confirmed through the prepreg 10B after the curing, and thus it is advantageous to allow the molded product to have a desired design and luxuriousness by the prepreg 10B.

Next, the method for manufacturing a prepreg of the third embodiment will be described.

Figure 6:
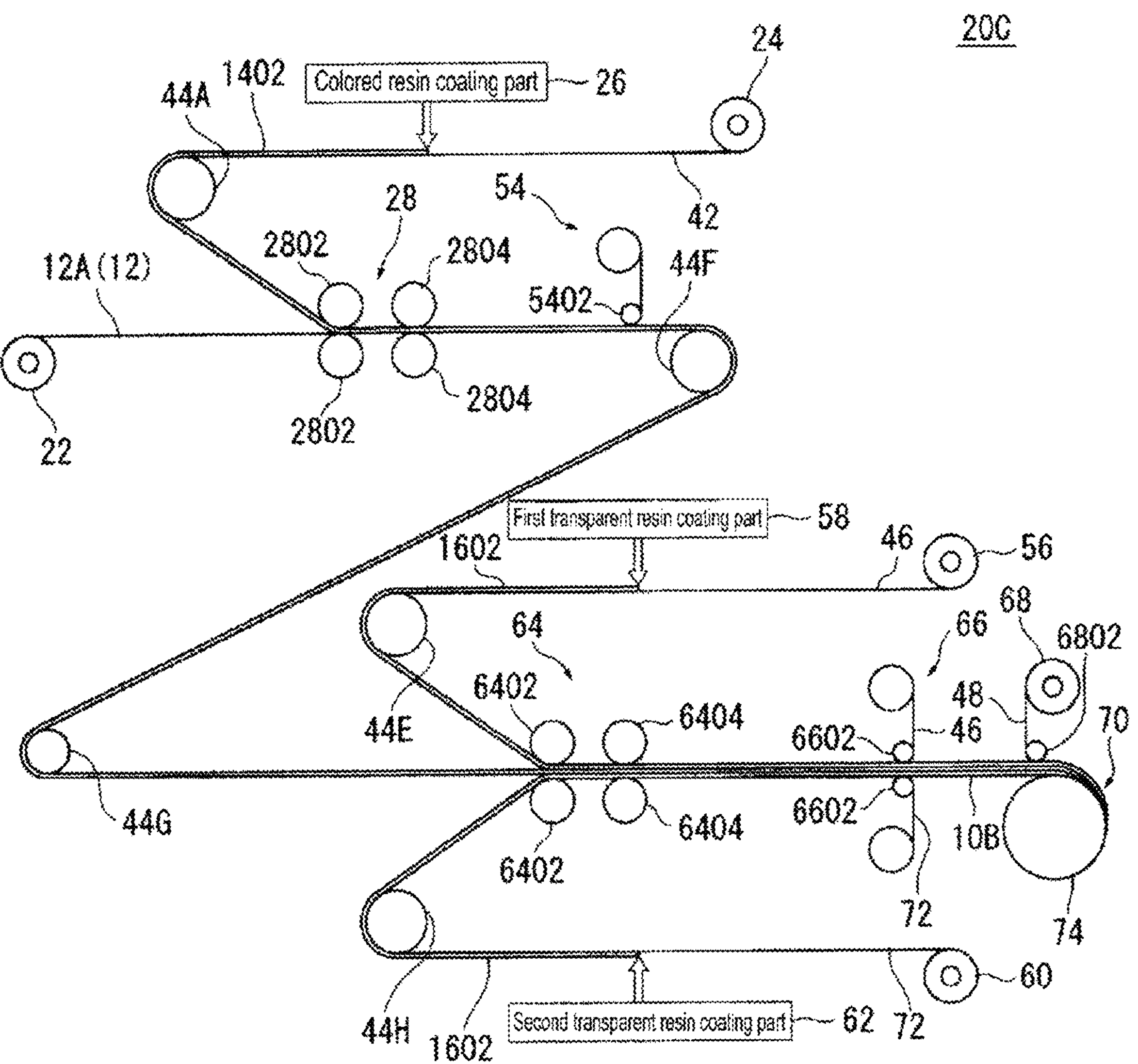
FIG. 6 is a schematic diagram of a manufacturing device corresponding to manufacturing process of a prepreg according to a third embodiment.

As illustrated in FIG. 6, in the third embodiment, a manufacturing device 20C of the prepreg 10B includes a fiber fabric supplying part 22, a first release paper supplying part 24, a colored resin coating part 26, a first pressurizing and heating part 28, a first release paper collecting part 54, a second release paper supplying part 56, a first transparent resin coating part 58, a third release paper supplying part 60, a second transparent resin coating part 62, a second pressurizing and heating part 64, a second release paper collecting part 66, a protective film laminating part 68, and a prepreg winding part 70.

In the third embodiment, the fiber fabric supplying part 22, the first release paper supplying part 24, the colored resin coating part 26, and the first pressurizing and heating part 28 are identical to those of the first embodiment, and thus the description thereof will be omitted.

FIG. 5A1 illustrates a cross-section of the glass fiber fabric 12A, and FIG. 5A2 illustrates a plan view of the glass fiber fabric 12A.

By the first pressurizing and heating part 28, as illustrated in FIG. 5A2, colored resin coating that impregnates the glass fiber fabric 12A with the colored resin 1402 having the opacifying property is performed by pressing the colored resin 1402 having the opacifying property onto the first face of the glass fiber fabric 12A and heating.

Note that, at this time, the point that the glass fiber fabric 12A is impregnated with the colored resin 1402 having the opacifying property from the first face of the glass fiber fabric 12A is similar to the cases of the first and second embodiments.

However, in the third embodiment, unlike the first and second embodiments, both of the faces of the glass fiber fabric 12A are not covered by colored resin layers 14 having a thickness. As illustrated in FIG. 5B2, even when the glass fiber fabric 12A is viewed from either of both faces of the glass fiber fabric 12A, the glass fiber fabric 12A colored by the colored resin 1402 having the opacifying property and the weave 1200 thereof can be visually confirmed.

This is because the thickness of the colored resin 1402 applied on the surface of the first release paper 42 by the colored resin coating part 26 is controlled in a manner that the glass fiber fabric 12A is impregnated with the colored resin 1402 and the colored resin layers 14 are not formed on both of the faces of the glass fiber fabric 12A.

The first release paper collecting part 54 releases and collects the first release paper 42 remained on the first face of the glass fiber fabric 12A impregnated with the colored resin 1402 having the opacifying property through a releasing roller 5402.

The second release paper supplying part 56 supplies a second release paper 46 from an original material of the second release paper 46 wound in a roll form.

The first transparent resin coating part 58 coats a surface of the second release paper 46 supplied from the second release paper supplying part 56 with a transparent resin 1602 that becomes transparent after being cured at a certain thickness while heating is performed by a heater.

Note that, by the first transparent resin coating part 58 and the second transparent resin coating part 62 described below, the thicknesses of the transparent resins 1602 to be applied are controlled.

The third release paper supplying part 60 supplies a third release paper 72 from an original material of the third release paper 72 wound in a roll form.

The second transparent resin coating part 62 coats a surface of the third release paper 72 supplied from the third release paper supplying part 60 with a transparent resin 1602 that becomes transparent after being cured on at a certain thickness while heating is performed by a heater.

The second pressurizing and heating part 64 includes a pair of pressurizing rollers 6402 and a pair of heating rollers 6404.

The pair of the pressurizing rollers 6402 overlays a transparent resin 1602, which becomes transparent after being cured on the surface of the second release paper 46 supplied through a guide roller 44E, on the second face of the glass fiber fabric 12A impregnated with the colored resin 1402 having the opacifying property supplied through two guide rollers 44F and 44G, and overlays a transparent resin 1602, which becomes transparent after being cured on the surface of the third release paper 72 supplied through a guide roller 44H, on the first face of the glass fiber fabric 12A impregnated with the colored resin 1402 having the opacifying property supplied through two guide rollers 44F and 44G.

The pair of heating rollers 6404 heats and softens the transparent resin 1602 that becomes transparent after being cured on the surface of the second release paper 46 and the transparent resin 1602 that becomes transparent after being cured on the surface of the third release paper 72, and presses these transparent resins 1602 onto the second face and the first face of the glass fiber fabric 12A.

By this, as illustrated in FIG. 5A2, the transparent resin coating that coats both the faces of the glass fiber fabric 12A with the transparent resin layers 16 that become transparent after being cured is performed, and in this stage, a prepreg 10B having a condition where the second release paper 46 and the third release paper 72 are laminated on both faces in the thickness direction can be obtained.

Thus, by releasing the second release paper 46 and the third release paper 72, the prepreg 10B can be obtained. As illustrated in FIG. 5B3, when the prepreg 10B is viewed from either side of the transparent resin layers 16, the glass fiber fabric 12A colored by the colored resin 1402 having the opacifying property and the weave 1200 thereof can be visually confirmed in the inner portion of the transparent resin layer 16.

The second release paper collecting part 66 releases the second release paper 46 and the third release paper 72 released from the prepreg 10B through releasing rollers 6602 and collects the second release paper 46 and the third release paper 72.

The protective film laminating part 68 laminates a protective film 48 supplied from an original material of the protective film 48 wound in a roll form on a first face in the thickness direction of the prepreg 10B, and in the present embodiment, the protective film 48 is laminated on the first face of the glass fiber fabric 12A, on which the transparent resin layer 16 is formed, through a laminating roller 6802.

The prepreg winding part 70 winds the prepreg 10B on which the protective film 48 is laminated, and by this, a prepreg original material 74 in a roll form is obtained.

Thus, the prepreg 10B is wound by interposing the protective film 48, and thus the transparent resin layers 16 of the prepreg 10B that are stacked are separated without contact.

As described above, according to the method for manufacturing the prepreg of the third embodiment, the glass fiber fabric 12A colored by the colored resin 1402 having the opacifying property and the weave 1200 thereof can be visually confirmed in the inner portion of the transparent resin layer 16 on both faces thereof.

That is, it is advantageous to reliably manufacture the prepreg 10B for obtaining a molded product having luxuriousness and a desired design by the colored resin 1402 having the opacifying property, without the need for a complicated process but by simple processes such as colored resin impregnating and transparent resin coating while suppression of manufacturing cost is attempted.

Furthermore, by blending an additive that suppresses resin flow at the time of curing in at least one of the colored resin 1402 or the transparent resin 1602, at the time of the pressuring and heating of the prepreg 10B, flow of the colored resin 1402 which has infiltrated into the glass fiber fabric 12A to the transparent resin layer 16 side is suppressed or flow of the transparent resin 1602 constituting the transparent resin layer 16 into the glass fiber fabric 12A is suppressed, and thus formation of the uneven pattern is prevented and it becomes advantageous to enhance design of the obtained molded product, similarly to the first and second embodiments.

Note that, in the embodiments, although the cases where the transparent or translucent glass fiber fabric is used as a reinforcement fiber fabric has been described, for example, needless to say, opaque reinforcement fiber fabric, such as an aramid fiber fabric using aramid fibers exhibiting yellow color or a carbon resin fiber fabric using carbon resin fibers exhibiting black colors, may be used.

However, when a transparent or translucent reinforcement fiber fabric is used like the embodiments, color of a colored resin is easily visually confirmed and it becomes advantageous to obtain a prepreg having a desired design and luxuriousness.

The invention claimed is:

1. A prepreg comprising:

a reinforcement fiber fabric including woven fibers, a colored resin layer, the colored resin layer being provided on a back surface of the reinforcement fiber fabric and being formed from a colored resin having an opacifying property, a transparent resin layer, the transparent resin layer being provided on a front surface of the reinforcement fiber fabric and being formed from a transparent resin becoming transparent after being cured, the reinforced fiber fabric and the colored resin being configured to be visible through the transparent resin layer, and an additive added to the colored resin or the transparent resin that suppresses flow of the colored resin or the transparent resin to the reinforcement fiber fabric, the reinforcement fiber fabric being impregnated with the colored resin, the additive containing elastomer fine particles having a uniform particle diameter of 1000 nm or less and silica microparticles having an average particle diameter of from 200 nm or more to 1000 nm or less, and the colored resin and the transparent resin being formed from an identical resin material.

2. A prepreg comprising:

a reinforcement fiber fabric including woven fibers; and a transparent resin layer, the transparent resin layer being provided on both faces of the reinforcement fiber fabric and being formed from a transparent resin becoming transparent after being cured, the reinforcement fiber fabric being impregnated with a colored resin having an opacifying property, the reinforcing fiber fabric being configured to be visible from any surface of the prepreg through the transparent resin layer, wherein at least one of the colored resin or the transparent resin is blended with an additive that suppresses flow of the colored resin or the transparent resin to the reinforcement fiber fabric when the prepreg is heat-cured, the additive contains elastomeric fine particles having a uniform particle size of 1000 nm or less and silica microparticles having an average particle diameter of from 200 nm or more to 1000 nm or less, and the colored resin and the transparent resin are formed from an identical resin material.

3. The prepreg according to claim 1, wherein the reinforcement fiber fabric is transparent or translucent.

4. The prepreg according to claim 1, wherein the transparent resin is colorless and transparent after being cured.

5. The prepreg according to claim 1, wherein the colored resin and the transparent resin are formed from an epoxy resin.

6. The prepreg according to claim 2, wherein the transparent resin and the colored resin are formed from an epoxy resin.

7. A method for manufacturing a prepreg, the method comprising:

impregnating a reinforcement fiber fabric including woven fibers with a colored resin that is colored and that has an opacifying property and forming a colored resin layer on a back surface of the reinforcement fiber fabric; and forming a transparent resin layer by coating a front surface of the reinforcement fiber fabric with a transparent resin that becomes transparent after being cured so that the reinforced fiber fabric and the colored resin are configured to be visible through the transparent resin layer, wherein at least one of the colored resin or the transparent resin is blended with an additive that suppresses flow of the colored resin or the transparent resin to the reinforcement fiber fabric when the prepreg is heat-cured, the additive contains elastomeric fine particles having a uniform particle size of 1000 nm or less and silica microparticles having an average particle diameter of from 200 nm or more to 1000 nm or less, and the colored resin and the transparent resin are formed from an identical resin material.

8. The method for manufacturing a prepreg according to claim 7, wherein the colored resin coating is performed by pressing the colored resin toward the first face back surface of the reinforcement fiber fabric and heating by a first pressurizing and heating part, and the transparent resin coating is performed by pressing the transparent resin toward the front surface of the reinforcement fiber fabric and heating by a second pressurizing and heating part after the colored resin coating.

9. The method for manufacturing a prepreg according to claim 7, wherein the colored resin coating that is performed by pressing the colored resin toward the back surface of the reinforcement fiber fabric and heating and the transparent resin coating that is performed by pressing the transparent resin toward the front surface of the reinforcement fiber fabric and heating are performed simultaneously by a single pressurizing and heating part.

10. A method for manufacturing a prepreg, the method comprising:

impregnating a reinforcement fiber fabric including woven fibers with a colored resin that is colored and that has an opacifying property; and forming a transparent resin layer on both faces of the reinforcement fiber fabric by coating both the faces with a transparent resin that becomes transparent after being cured so that the reinforced fiber fabric and the colored resin are configured to be visible through the transparent resin layer, wherein at least one of the colored resin or the transparent resin is blended with an additive that suppresses flow of the colored resin or the transparent resin to the reinforcement fiber fabric when the prepreg is heat-cured, the additive contains elastomeric fine particles having a uniform particle size of 1000 nm or less and silica microparticles having an average particle diameter of from 200 nm or more to 1000 nm or less, and the colored resin and the transparent resin are formed from an identical resin material.

11. The method for manufacturing a prepreg according to claim 10, wherein the colored resin impregnating is performed by pressing the colored resin toward both faces of the reinforcement fiber fabric and heating by a first pressurizing and heating part, and the transparent resin coating is performed by pressing the transparent resin toward both the faces of the reinforcement fiber fabric and heating by a second pressurizing and heating part after the colored resin impregnating.

12. The method for manufacturing a prepreg according to claim 7, wherein the reinforcement fiber fabric is transparent or translucent.

13. The method for manufacturing a prepreg according to claim 7, wherein the transparent resin is colorless and transparent after being cured.

14. The method for manufacturing a prepreg according to claim 7, wherein the additive that suppresses flow of the colored resin or the transparent resin during heat curing of the prepreg is blended in the colored resin.

15. The method for manufacturing a prepreg according to claim 7, wherein the colored resin and the transparent resin are an epoxy resin.

16. The method for manufacturing a prepreg according to claim 14, wherein the additive that suppresses flow of the colored resin or the transparent resin during heat curing of the prepreg is blended in the transparent resin.

17. The method for manufacturing a prepreg according to claim 7, wherein the additive that suppresses flow of the colored resin or the transparent resin during heat curing of the prepreg is blended in the transparent resin.

* * * * *